March 15, 1938.    C. B. LOWE ET AL    2,111,511

LOCK

Filed March 18, 1933

INVENTOR
C. B. Lowe &
K. A. Braunning
BY
A. H. Golden
ATTORNEY

Patented Mar. 15, 1938

2,111,511

UNITED STATES PATENT OFFICE 2,111,511

LOCK

Charles B. Lowe and Karl A. Brauning, Stamford, Conn., assignors to The Yale & Towne Mfg. Co., Stamford, Conn., a corporation of Connecticut Application March 18, 1933, Serial No. 661,541

18 Claims. (Cl. 70—221)

Our invention relates to a free turning handle. More especially, it relates to a free turning handle adapted to be used on automobiles and mounted for rotation on a rose or escutcheon carried by the automobile door body.

It is an object of our invention to arrange a free turning handle which is adapted, in one adjustment thereof, to be secured to the usual type of spindle operating the door latch, whereby rotation of the handle will retract the latch in a manner well known in the art.

We have found that in free turning handles of the prior art, when the handle grip is released from the spindle, it is sometimes possible to build up enough friction between the shank of the handle and the spindle to operate the spindle. An outstanding feature of the design of our invention, resides in the locking of the spindle to the rose or escutcheon, at the same time that the handle is released relatively to the spindle, so that the building up of friction between the shank of the handle and the spindle will be ineffective to operate the spindle.

A further feature of our invention is an arrangement between the key operated locking mechanism carried by the handle and the actual locking means operated thereby, whereby when the handle is in free turning relation relatively to the assembly, the actuating means carried by the handle key operated mechanism are in an inoperative position, so that the handle may rotate freely relatively to the locking means.

A further feature of our invention resides in the arrangement of the assembly so that it may be secured quite easily to an automobile door, and whereby the securing means may not be released unless the locking mechanism is operated by an authorized person.

A further feature of our invention is an arrangement whereby the handle mechanism is rigidly associated with the escutcheon, and where the spindle is likewise rigidly associated in firm bearing relation to the escutcheon, and where the possible angularity between the handle and spindle and the locking mechanism, is absorbed in a universally mounted connection between the spindle and its operating means.

Figure 1:
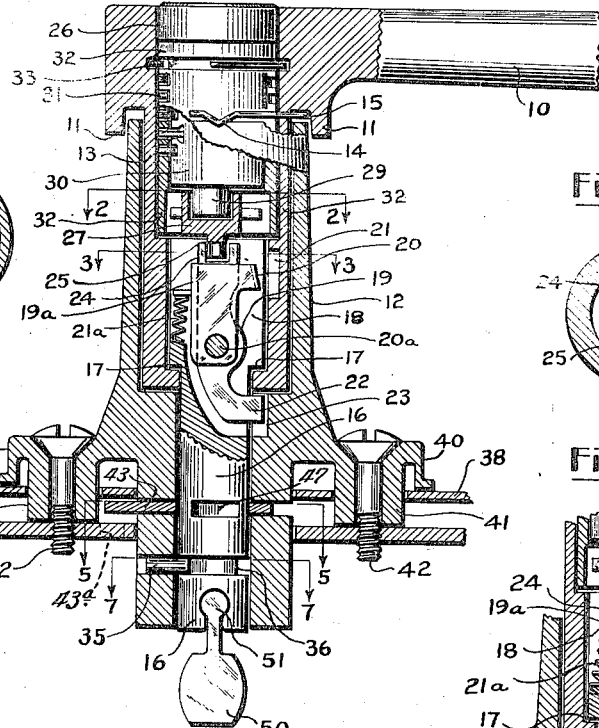
Figure 2:
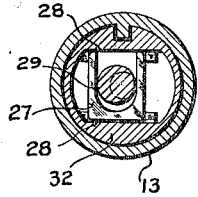
Figure 3:
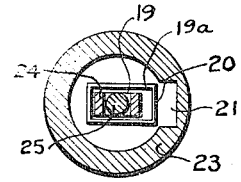
Figure 4:
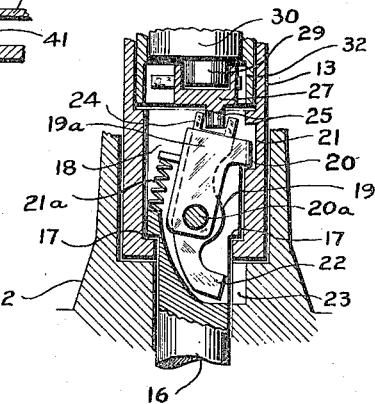
Figure 6:
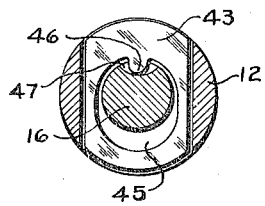
Figure 5:
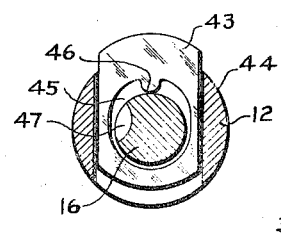
Figure 7:
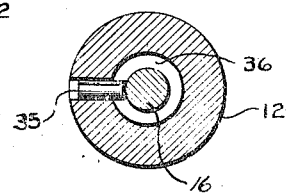

For a further and more detailed description of our invention, we shall refer to the drawing, wherein Fig. 1 is a partial section of our handle and locking mechanism illustrating its operation. Figs. 2 and 3 are respectively sections taken along the lines 2—2 and 3—3 of Fig. 1. Fig. 4 is a view similar to Fig. 1 of a part of the mechanism, and illustrating its position when the handle is locked to the spindle for usual operation. Figs. 5 and 6 are sections taken along lines 5—5 of Fig. 1 illustrating the construction of the means for securing the handle and its assembly to the automotive door, the means being shown in release position in Fig. 6 and in retaining position in Fig. 5. Fig. 7 is a view along lines 7—7 of Fig. 1.

In the drawing, and especially Fig. 1, reference numeral 10 indicates a handle grip member having a flange portion 11 adapted to overlie the upper surface of the rose or escutcheon 12 for rotation thereon. The grip member 10 is integral with a sleeve 13 which fits into a cylindrical opening in the rose or escutcheon 12 for firm bearing rotation relatively thereto. The upper surface of the escutcheon 12 is notched at the point 14 and a spring 15 has a portion resting in the notch and lying between the under surface of the handle 10 and the top surface of the escutcheon 12 for maintaining the two members against vibration.

A lock operating spindle 16 has a shoulder portion 17 whereby it is maintained against downward movement relative to the sleeve 13 and is adapted to rotate freely relatively to the sleeve 13 but in rather firm bearing relation to the same. The upper part of the spindle is milled out to form a grooved opening 18 and a peculiarly shaped lever 19 is pivoted thereto at 20a for rotation thereon. This lever member 19 has mounted thereon, a member 19a which has a locking portion 20 adapted to fit into a notch 21 of the handle extension sleeve 13. The member 19a is spring pressed in a locking direction by the spring 21a but is prevented from movement into locking position except when the lever 19 moves to its position of Fig. 4. If in that position, the notch 21 is not positioned opposite the portion 20 of member 19a, that member will remain in a spring pressed position slightly counter-clockwise of its position of Fig. 4 until the handle sleeve 13 has been properly rotated, when it will spring into notch 21. The lever 19 has also an integral lower locking portion 22 adapted to fit into a notch 23 of the rose or escutcheon 12.

The lever 19 is notched at the point 24 for co-operation with a pin 25 of a locking cylinder assembly 26. The locking pin is carried by a cam 27 which is movable in guide 28 of the sleeve member 32 of the cylinder assembly, as shown particularly in Fig. 2. The movement of the cam member 27 is contributed by the pin 29 which is secured to the usual type of sliding tumbler plug 30 well known in the art. The cylinder plug is retained by a series of tumblers 31 against rotation relatively to the sleeve member 32 which in turn is secured against rotation relatively to the handle 10 by any suitable means, and against endwise movement relatively thereto by a spring ring 33, of a type well known in the art.

It will be readily understood that when the proper key is inserted into the locking plug 30, it will act to rotate the pin 29, which will move the cam member 27 on its guide 28 so as to cause pin 25 to rotate the lever 19 about its pivot 20a into its position of Fig. 1 or into its position of Fig. 4. It will be readily seen that in the position of Fig. 1, the locking lever 19 will be adapted to maintain the spindle 16, to which it is secured by the pin 20a, against any rotation relatively to the escutcheon or rose 12 into whose notch 23, its lower locking portion 22 fits. At the same time, the handle 10 will be released for free turning movement relatively to the spindle. It will also be apparent that when the lever 19 is in the position of Fig. 4, its lower locking portion 22 will be released from the rose notch 23, and the lever 19a will be actuated by spring 21a so that its portion 20 will be locked into the notch 21 of the handle sleeve 13, so as to lock the spindle positively to the handle for rotation therewith in the usual manner.

It will also be readily understood that when the pin 25 which operates the lever 19, is in its position of Fig. 1, in which position the handle is in free turning relation relatively to the levers 19 and 19a and therefore the spindle 16, the pin 25 will occupy a central position so that rotation of the handle member will not move the pin relatively to the lever 19 except as it may rotate in frictional contact relatively to the cutout portion 24. Thus, there is no obstruction against the free rotation of the handle when it is in locked position. While we have shown this particular means of obtaining a free rotation of the handle lock cam member relatively to the assembly locking mechanism, it should be understood that other means may be arranged so that the pin will be in an ineffective position relatively to the locking lever 19 when the handle is intended for free rotation.

For securing the spindle against endwise movement relatively to the escutcheon or rose, we use a pin 35 fitting in a groove 36 of the spindle as is quite apparent from Figs. 1 and 7.

Reference numeral 38 represents the outer plate of the automobile door to which the rose 12 is intended to be secured, while reference numeral 39 may represent a rearward reinforcing plate or the front plate of the door lock. The escutcheon is equipped with extensions 40 having lugs 41 whereby it may be retained against rotation relatively to the plate 38 and screws 42 secure the rose firmly to the car plate or lock body 39 as may be the case. It is desirable to prevent removal of the escutcheon or rose from the car body except by authorized persons having the lock key, and for that reason we utilize a locking plate member 43 shown more particularly in Figs. 5 and 6. This plate member rides in a slotted portion 44 of the rose 12 and is cut out at 45 for the passage of the spindle member 16. It is equipped with a tongue 46 adapted to align with the cutout portion 47 of the spindle in the rotated release position of the spindle. When the portion 47 of the spindle is opposite tongue 46, the plate 43 may be moved to the position of Fig. 6 by a suitable tool inserted through a hole 43a, usually present in plate 39. In Fig. 6, plate 43 does not project beyond the periphery of the escutcheon member 12, so that that member may be removed relatively to the lock and door body. However, in the locking position of the spindle 16 which is illustrated in Fig. 5, the plate 43 may not be moved downwardly to the position of Fig. 6, and therefore the escutcheon will be firmly secured to the car body despite the removal of the screws 40.

In the handles of the prior art, in order to allow for any possible angular relationship between the handle and its spindle, and the locking mechanism of the lock, it has been customary to mount the handle in an adjustable and readily movable relationship to the rose 12, some of the prior art patents having been directed to a universal mounting of the handle relatively to the rose. We prefer to mount our handle rigid relative to the rose, employing a long substantial bearing between the handle and rose, and a similar long substantial bearing between the spindle and rose. In order to allow for any angularity, we use the lock operating piece 50 having a tongue connection 51 with the spindle 16. This tongue connection allows for the pivotal rotation of the piece 50 about the circular bearing of its tongue member 51 in the spindle. It also allows for a sliding relationship perpendicular to the plane of the drawing of Fig. 1, of the member 50, so as to permit of an adjustment thereof relatively to the spindle 16 for the purpose of absorbing angular relation between the handle and spindle, and the locking mechanism.

While we have disclosed a particular modification of our invention, it should be understood that we consider our contribution to the art to be of very broad scope, and that we do not wish to be limited in the patent monopoly we may obtain except as may be set forth in the claims appended hereto.

What we claim is:

1. In a handle assembly of the class described, a rose, a handle grip member, a spindle, a detent carried by said spindle and operable in one position to lock the spindle to the rose while releasing it from the handle, and in another position to lock the spindle to the handle while releasing it from the rose, means carried by said handle grip member and movable relatively thereto for operating said detent, said means being positioned for free and non-operating rotation relatively to said spindle and detent when said handle is disconnected from said spindle.

2. In a handle assembly of the class described, a rose, a handle grip member, a spindle, a detent in said assembly adapted in one position to lock the spindle to the rose and release it from the handle grip, and in another position to release the spindle from the rose and lock it to the handle grip, a lock carried by said handle grip and having cam means for operating said detent member, and means for controlling said cam means whereby said cam means are positioned for free and non-operating rotation relatively to said spindle and detent when said handle is disconnected from said spindle.

3. In a handle assembly of the class described, a rose, a handle grip member mounted thereon, a spindle mounted in said rose, a detent in said assembly adapted in one position to lock the spindle to the rose and release it from the handle grip, and in another position to release the spindle from the rose and lock it to the handle grip, means carried by said handle grip member for operating said detent and movable from a dead center to an off center position relatively to the axis of rotation of said handle, and a lock in said handle for operating said means.

4. In a handle assembly of the class described, a rose, a handle grip member mounted thereon, a spindle mounted on said rose, a detent in said assembly adapted in one position to lock the spindle to the rose and release it from the handle grip, and in another position to release the spindle from the rose and lock it to the handle grip, a lock carried by said handle grip, and a cam slidably mounted relatively to said handle and operable by said lock for operating said detent member.

5. In a handle assembly of the class described, a rose, a handle grip member, a spindle, a detent carried by said spindle and operable in one position to lock the spindle to the rose while releasing it from the handle, and in another position to lock the spindle to the handle while releasing it from the rose, a key operated lock carried by and rotatable with said handle grip, and means movable relatively to said handle by key operation of said lock for operating said detent member.

6. In a handle assembly, a spindle, a handle adapted to operate said spindle, means for releasing said handle to rotate freely of said spindle when in locked condition, a lock carried by said handle for operating said means, and a control means operable by said lock adapted to occupy a dead center position in the axis of rotation of the handle when in locking position so as to have no effective movement as said handle rotates.

7. In a handle assembly, a spindle, a handle adapted to operate said spindle, means for releasing said handle to rotate freely of said spindle when in locked condition, lock mechanism carried by said handle and having cam means adapted to operate said means to disconnect said handle for free rotation, said cam means being adapted to occupy a dead center position in the axis of rotation of the handle when said handle and its lock mechanism rotate freely of the assembly.

8. In a handle assembly of the class described, a rose, a rotatable handle grip member, a spindle, detent mechanism in said assembly adapted in one position to lock the spindle to the rose and release it from the handle grip, and in another position to release the spindle from the rose and lock it to the handle grip, a lock carried by said handle grip and having means for operating said detent mechanism, the detent operating means of said lock being adapted to lie in a dead center position in the axis of rotation of said handle when said detent mechanism is in handle releasing position so as to have no effective movement as said handle rotates freely of the spindle in its locked condition.

9. In a handle assembly of the class described, a rose, a spindle traversing said rose, means for locking said rose to a door plate, and means on said spindle for obstructing the movement of said means to rose releasing position until said spindle is rotated to a predetermined position.

10. In a handle assembly, a handle grip member, a spindle, a detent adapted to lock said handle to said spindle and to release the handle for free rotation, a rotating key plug in said handle and rotatable relatively thereto when key operated, a cam movable by rotation of said key plug relatively to said handle for moving said detent to release the handle from the spindle for free rotation, said cam being movable diametrically relatively to the axis of rotation of the handle, and adapted to lie in the axis of rotation when said detent has released said handle for free rotation, whereby said cam will have no effective movement during said free rotation.

11. In a handle assembly, a handle grip member, a spindle, a detent carried by said spindle adapted to lock said handle to said spindle and to release the handle for free rotation, a rotating key plug in said handle and rotatable relatively thereto when key operated, a cam movable by rotation of said key plug relatively to said handle for moving said detent to release the handle from the spindle for free rotation, said cam being movable diametrically relatively to the axis of rotation of the handle, and adapted to lie in the axis of rotation when said detent has released said handle for free rotation, whereby said cam will have no effective movement during said free rotation.

12. In a handle lock, a handle grip member, a spindle, detent means adapted to lock said handle to said spindle and to release the handle for free rotation relatively to said spindle while locking said spindle against rotation, a rotating key plug in said handle and rotatable relatively thereto when key operated, a cam movable by rotation of said key plug relatively to said handle for moving said detent means to release the handle from the spindle for free rotation, while locking said spindle, said cam being movable diametrically relatively to the axis of rotation of the handle, and adapted to lie in the axis of rotation when said detent has released said handle for free rotation, whereby said cam will have no effective movement during said free rotation.

13. In a handle assembly, a handle grip member, a spindle, a detent adapted to lock said handle to said spindle and to release the handle for free rotation relatively to said spindle, a rotating key plug in said handle and rotatable relatively thereto when key operated, a cam carried by said handle and movable by rotation of said key plug relatively to said handle for moving said detent to release the handle from the spindle for free rotation, said cam being movable diametrically relatively to the axis of rotation of the handle, and adapted to lie in the axis of rotation when said detent has released said handle for free rotation, whereby said cam will have no effective movement during said free rotation.

14. In a handle assembly, a handle grip member, a spindle, a detent adapted to lock said handle to said spindle and to release the handle for free rotation relatively to said spindle, a rotating key plug in said handle and rotatable relatively thereto when key operated, a cam movable by rotation of said key plug relatively to said handle for moving said detent to release the handle from the spindle for free rotation relatively to the spindle, and means whereby said cam is positioned in the axis of rotation of the handle relatively to said spindle when said cam has moved said detent to release the handle for free rotation relatively to said spindle, whereby said cam will have no effective movement during said free rotation.

15. In a handle assembly, a handle grip member, a spindle, a detent adapted to lock said handle to said spindle and to release the handle for free rotation relatively to said spindle, a rotating key plug in said handle and rotatable relatively thereto when key operated, a cam movable by rotation of said key plug relatively to said handle for moving said detent to release the handle from the spindle for free rotation relatively to the spindle, and means whereby the said cam is positioned in dead center relation to the axis of the handle rotation when said cam has moved said detent to release the handle for free rotation relatively to said spindle, whereby said cam will have no effective movement during said free rotation.

16. In a handle assembly, a handle grip member, a spindle, a detent adapted to lock said handle to said spindle and to release the handle for free rotation relatively to said spindle, a rotating key plug in said handle and rotatable relatively thereto when key operated, a cam movable by rotation of said key plug relatively to said handle for moving said detent to release the handle from the spindle for free rotation relatively to the spindle, means mounting said cam for movement diametrically relatively to the axis of rotation of the handle, said cam being adapted to lie in the axis of rotation when said detent has released said handle for free rotation relatively to said spindle, whereby said cam will have no effective movement during said free rotation.

17. In a handle lock, a handle grip member, a spindle, detent means adapted to lock said handle to said spindle and to release the handle for free rotation relatively to said spindle while locking said spindle, a rotating key plug in said handle and rotatable relatively thereto when key operated, a cam movable by rotation of said key plug relatively to said handle for moving said detent means to release the handle from the spindle while locking said spindle, means mounting said cam for movement diametrically relatively to the axis of rotation of the handle, and adapted to lie in the axis of rotation when said detent has released said handle for free rotation relatively to said spindle, whereby said cam will have no effective movement during said free rotation.

18. In a lock of the class described, a rotatively mounted knob, a primary lock mechanism in said knob, a lock spindle positioned axially of said knob, and throw means connecting said lock spindle and said primary lock mechanism, said throw means embodying a throw pin movable in a circular path and normally positioned substantially on the common axis of said knob and said lock spindle whereby said knob together with said primary lock mechanism may be rotated without rotating said spindle.

KARL A. BRAUNING.
CHARLES B. LOWE.